Patented Mar. 14, 1933

1,901,746

UNITED STATES PATENT OFFICE

CLYDE O. HENKE, OF SOUTH MILWAUKEE, WISCONSIN, AND GASTAŌ ETZEL, OF PENNS GROVE, NEW JERSEY, ASSIGNORS TO E. I. DU PONT DE NEMOURS & COMPANY, OF WILMINGTON, DELAWARE, A CORPORATION OF DELAWARE

PROCESS FOR PREPARING CAMPHENE

No Drawing.   Application filed March 30, 1932.   Serial No. 602,102.

This invention relates to a process for manufacturing camphene. It is an object of this invention to provide a practical and economical process for manufacturing camphene of high quality and substantially free of chlorine. Other and further important objects of this invention will appear as the description proceeds.

Camphene, $C_{10}H_{16}$, is a valuable commercial intermediate in the manufacture of camphor. It is generally manufactured by the removal of hydrochloric acid from bornylchloride, $C_{10}H_{17}Cl$, a product obtained by reacting with hydrochloric acid gas upon pinene, and generally, though erroneously, referred to in the art as pinene-hydrochloride. This elimination of hydrochloric acid may theoretically be effected by reacting upon bornyl-chloride with alkaline reacting substances, such as lime. It has been found, however, that under such conditions the reaction does not go to completion. Part of the bornyl chloride remains unchanged, and since it is very difficult to separate camphene from bornyl chloride, the product is considered as a whole as an impure camphene containing a certain percentage of residual chlorine. It is obvious that the purer the camphene, the lower is its chlorine content.

The residual chlorine in camphene is a highly objectionable element, since it finds its way into the camphor which is eventually derived from the camphene, and in turn depreciates its value for most of its commercial uses.

Many efforts have been made in the art to modify the process of conversion of bornyl chloride into camphene so as to reduce the chlorine content of the product. Among others, it has been suggested to add to the reaction mass an "assistant", generally a weak organic acid in various proportions, ranging in the art from about 10% by weight to several times the weight of the bornyl chloride being used. (U. S. Patents 890,465 and 1,721,990.) Phenol, naphthol, acetic acid, stearic acid, paratoluene-sulfonic acid, naphthalene-mono- or disulfonic acids, naphthol sulfonic acids, and the sodium salts of any of these are some of the "assistants" suggested for this purpose. We have experimented with most of these compounds, and found that although many of these are helpful in the elimination of most of the chlorine from bornyl chloride, the elimination of the residual amounts becomes increasingly difficult as the amount diminishes. With none of these "assistants" have we succeeded in reducing the chlorine content below 0.65%; while many of these become practically useless as assistants as soon as the chlorine content has dropped to about 2 or 3%.

We have now found that abietene sulfonic acid, for instance, the product obtained according to U. S. Patent No. 1,853,-352, and its water-soluble salts, such as the alkali metal, alkaline earth or magnesium salts, form excellent assistants for the reaction above mentioned. Since the abietene sulfonic acid is manufactured in commerce as its sodium salt, this compound is to be preferred.

The efficiency of the above type of compound for the purpose mentioned manifests itself in two ways. The quantity of assistant required to produce the desired effect is much smaller than the quantities of the other assistants specified in the art (cf. U. S. Patent 1,721,990). And the chlorine content of the product may be reduced by its aid to less than 0.1 of 1%; in fact, we have regularly obtained products of as low a chlorine content as 0.06% without any exceptional difficulty.

The effectiveness of our novel assistant may be shown more clearly by the following comparative table. In this table are set forth the results obtained by using different assistants under otherwise identical conditions. It will be noted that the ratio of assistant to bornyl chloride in each case is about 1% by weight.

| Catalyst or assistant | Weight of assistant | Water | Calcined dolomite | Bornyl chloride | Temp. | Time, hrs. | % Cl in product |
|---|---|---|---|---|---|---|---|
| Naphthalene sodium sulfonate | 70 | 5000 | 1195 | 6800 | 200 | 15 | 3.84 |
| Phenol | 70 | 5000 | 1195 | 6800 | 200 | 15 | 1.89 |
| Sodium stearate | 70 | 5000 | 1195 | 6800 | 200 | 15 | 0.65 |
| Abietene-sodium-sulfonate | 70 | 5000 | 1195 | 6800 | 200 | 15 | 0.06 |
| Abietene-sodium-sulfonate | 70 | 7000 | 1195 | 6800 | 200 | 15 | 0.06 |
| None | | 9000 | | 585 | 3400 | 200 | 15 | 3.7 |

| | | | Hydrated lime | MgO | | | | |
|---|---|---|---|---|---|---|---|---|
| None | | 6000 | 1,280 | 252 | 6800 | 200 | 18 | 2.86 |
| None | | 3500 | 687 | 120 | 3400 | 200 | 20 | 1.48 |

It will be noted that our novel assistant gives a product containing less than 0.1 of 1% of residual chlorine, and is about ten times as effective in this respect as the nearest assistant of the art thereto, namely sodium stearate.

Without limiting our invention to any particular procedure, the following example will serve to illustrate our preferred mode of operation. Parts given are parts by weight.

*Example*

5000 parts of water, 70 parts of sodium abietene sulfonate, 1195 parts of calcined dolomite containing about 40% magnesium oxide (or an equivalent mixture of calcium hydroxide and magnesium oxide), and 6800 parts of bornyl chloride are charged into an autoclave. The mixture is heated while stirring at 200° C. for 15 hours. It is then steam distilled out of the autoclave and the upper crude camphene layer separated from the steam distillate. This crude camphene weighs about 5350 parts and has the very low chlorine content of about 0.06%. The crude camphene may be fractionated to give pure camphene, if desired.

It will be noted that in the above example we preferred to use calcined dolomite or a mixture of calcium oxide and magnesium oxide as alkaline agent. Any other alkaline agent may be used, however, although experimentation may be necessary in certain individual cases to determine the optimum conditions corresponding to the particular alkaline agent. For instance, in the case of sodium hydroxide, we found that best results are obtained by increasing the amount of water to about twice the value indicated above.

Again, it is known that certain alkalis will react upon camphene to produce camphene hydrate. Such alkalis should be clearly avoided, or else care should be taken that no excesses of such alkali are present in the reaction mass after the bulk of the bornyl chloride has been converted into camphene. Lime is an example of such an agent. If used in excess, it would tend to convert the product of the reaction into camphene hydrate. For this reason we have found it desirable in our preferred procedure above set forth to limit the quantity of lime to not higher than 85% of that theoretically required to absorb all the chlorine from the bornyl chloride. The deficiency is then made up with magnesium oxide, and an excess of about 15% is provided by the same compound, since it appears to be harmless to the resulting camphene.

The quantity of abietene sulfonic acid used may vary within wide limits, say between 0.5 and 3.0% by weight of the bornyl chloride. There is, however, no special advantage from increasing this quantity beyond about 1%; nor any special harm, except waste of the valuable assistant.

Instead of applying our process to pure bornyl chloride a crude bornyl chloride containing dipentene-hydrochloride and other terpene halides may be used. In this case the chlorine is eliminated substantially from the entire mixture, yielding a mixture consisting principally of camphene and dipentene, which may then be separated by known methods.

It will be understood that many other variations and modifications are possible in our preferred procedure without departing from the spirit of this invention.

In the claims below it should be understood that by the phrase "water-soluble compound of abietene-sulfonic acid" we mean to cover and include abietene sulfonic acid itself as well as its water-soluble salts, such as alkali metal, alkaline earth and magnesium salts.

We claim:

1. A process for preparing camphene which comprises reacting upon bornyl chloride in an aqueous medium with an alkaline agent in the presence of a water-soluble compound of abietene-sulfonic acid.

2. A process for preparing camphene which comprises reacting upon bornyl chloride in an aqueous medium with an alkaline agent in the presence of a small quantity of a water-soluble salt of abietene-sulfonic acid.

3. A process for preparing camphene which comprises reacting upon bornyl chloride in an aqueous medium with an alkaline agent in the presence of about 0.5 to 3.0% by weight of a salt of abietene-sulfonic acid selected from the group consisting of alkali metal, alkaline earth and magnesium salts.

4. A process for preparing camphene which comprises reacting upon bornyl chloride in an aqueous medium with an alkaline agent in the presence of about 1% by weight of the sodium salt of abietene sulfonic acid.

5. A process for preparing camphene which comprises heating under pressure a mixture of bornyl chloride, calcined dolomite, water and a water-soluble salt of abietene sulfonic acid.

6. A process for preparing camphene which comprises heating under pressure a mixture of bornyl chloride, calcined dolomite, water and about 0.5 to 3.0% by weight of the sodium salt of abietene sulfonic acid, and continuing the reaction until the chlorine content of the product after separation of the inorganic chlorides has been reduced to less than 0.1% by weight.

7. A process for preparing camphene which comprises heating under pressure a mixture of bornyl chloride, calcium hydroxide, magnesium oxide, water and a water-soluble salt of abietene sulfonic acid.

8. A process for preparing camphene which comprises heating under pressure a mixture of bornyl chloride, calcium hydroxide, magnesium oxide, water and a water-soluble salt of abietene sulfonic acid, the amount of calcium hydroxide in the mixture not exceeding 85% of that theoretically equivalent to the quantity of bornyl chloride used.

9. A process for preparing camphene which comprises heating under pressure a mixture of bornyl chloride, calcium hydroxide, magnesium oxide, water and a water-soluble salt of abietene sulfonic acid, the amount of calcium hydroxide in the mixture not exceeding 85% of that theoretically equivalent to the quantity of bornyl chloride used, and isolating a camphene product containing less than 0.1% of chlorine by weight.

10. A process for preparing camphene, which comprises heating substantially 680 parts by weight of bornyl chloride, 500 parts of water, 120 parts of calcined dolomite and 7 parts of sodium abietene sulfonate, at a temperature of about 200° C., under pressure, and for a period of about 15 hours.

11. A process for preparing camphene, which comprises heating substantially 680 parts by weight of bornyl chloride, 500 parts of water, 120 parts of calcined dolomite and 7 parts of sodium abietene sulfonate, at a temperature of about 200° C., under pressure, and for a period of about 15 hours, and steam distilling the mass to recover camphene.

12. In the process of producing camphene by reacting with an alkaline agent upon bornyl chloride in the presence of water, the step which comprises effecting the reaction in the presence of a water-soluble compound of abietene-sulfonic acid.

13. In the process of producing camphene by reacting with an alkaline agent upon bornyl chloride in the presence of water, the step which comprises effecting the reaction in the presence of a salt of abietene-sulfonic acid selected from the group consisting of alkali metal, alkaline earth and magnesium salts.

14. In the process of producing camphene by reacting with an alkaline agent upon bornyl chloride in the presence of water, the step which comprises effecting the reaction in the presence of sodium abietene sulfonate.

15. In the process of producing camphene by reacting with an alkaline agent upon bornyl chloride in the presence of water, the step which comprises effecting the reaction in the presence of calcined dolomite as alkaline agent, and sodium abietene sulfonate as assistant.

16. A process for preparing camphene which comprises heating under pressure a mixture of crude bornyl chloride containing dipentene-hydrochloride and other terpene halides, calcium hydroxide, magnesium oxide, water and a water-soluble salt of abietene sulfonic acid.

In testimony whereof we affix our signatures.

CLYDE O. HENKE.
GASTAŌ ETZEL.